United States Patent
Carrilho et al.

(10) Patent No.: US 9,514,851 B2
(45) Date of Patent: Dec. 6, 2016

(54) RIB-TYPE ROUGHNESS DESIGN FOR IMPROVED HEAT TRANSFER IN PWR ROD BUNDLES

(71) Applicant: WESTINGHOUSE ELECTRIC COMPANY LLC, Cranberry Township, PA (US)

(72) Inventors: Leo A. Carrilho, Columbia, SC (US); Milorad B. Dzodzo, Monroeville, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 628 days.

(21) Appl. No.: 14/064,531

(22) Filed: Oct. 28, 2013

(65) Prior Publication Data
US 2014/0270047 A1    Sep. 18, 2014

Related U.S. Application Data
(60) Provisional application No. 61/776,815, filed on Mar. 12, 2013.

(51) Int. Cl.
*G21C 3/08*    (2006.01)
*G21C 3/322*    (2006.01)

(52) U.S. Cl.
CPC .............. *G21C 3/08* (2013.01); *G21C 3/322* (2013.01); *Y02E 30/40* (2013.01)

(58) Field of Classification Search
CPC ..................................................... G21C 3/08
(Continued)

(56) References Cited

U.S. PATENT DOCUMENTS 3,131,129 A * 4/1964 Morrison ................ G21C 3/04
376/454
3,164,528 A * 1/1965 White ...................... G21C 3/16
376/454
(Continued)

FOREIGN PATENT DOCUMENTS

DE      1 079 749         4/1960
EP       0555081 A1       8/1993
(Continued)

OTHER PUBLICATIONS

Vatulin et al. "Unified Fuel Elements Development for Research Reactors", The 1998 International Reduced Enrichment for Research and Test Reactors Meeting, San Paulo, Brazil, Oct. 18-23, 1998.
(Continued)

*Primary Examiner* — Jack W Keith
*Assistant Examiner* — Daniel Wasil
(74) *Attorney, Agent, or Firm* — Joseph C. Spadacene; Westinghouse Electric Company LLC

(57) ABSTRACT

The invention pertains to a nuclear fuel rod for a nuclear reactor. The fuel rod has a cladding. The cladding's external surface has a surface texture that includes a rib. The rib coils around the circumference of the cladding. The rib length forms a sequence of continuous rib loops uniformly spaced along an axial length of the cladding. The ratio of rib height to cladding diameter is greater than or equal to 0.0134 and less than or equal to 0.0268. The ratio of rib height to rib width is greater than or equal to 0.8 and less than or equal to 1.2. A pitch measured between adjacent rib loops is greater than or equal to 9× rib height and less than or equal to 12× rib height. The rib enhances fuel rod heat transfer in a region downstream of grid mixing vanes, where turbulence is dissipated.

6 Claims, 5 Drawing Sheets

(58) Field of Classification Search
USPC .................................................. 376/454, 436
See application file for complete search history.

(56) References Cited

U.S. PATENT DOCUMENTS

| | | | | |
|---|---|---|---|---|
| 3,222,256 | A * | 12/1965 | Fletcher ................... | G21C 3/10 |
| | | | | 376/454 |
| 3,361,640 | A * | 1/1968 | Hassig ..................... | G21C 3/32 |
| | | | | 376/454 |
| 3,930,941 | A * | 1/1976 | Meerwald ................ | G21C 3/08 |
| | | | | 376/454 |
| 4,038,138 | A * | 7/1977 | Linning .................. | G21C 3/338 |
| | | | | 376/454 |
| 4,324,618 | A * | 4/1982 | Schluderberg ......... | G21C 3/338 |
| | | | | 376/454 |
| 4,486,384 | A * | 12/1984 | Rau ........................ | G21C 3/326 |
| | | | | 376/434 |
| 4,968,480 | A | 11/1990 | Swanson | |
| 6,813,329 | B1 * | 11/2004 | Byers ...................... | G21C 3/06 |
| | | | | 376/454 |
| 2007/0206717 | A1 * | 9/2007 | Conner .................. | G21C 3/322 |
| | | | | 376/438 |

FOREIGN PATENT DOCUMENTS

| | | |
|---|---|---|
| JP | 07-104091 | 4/1995 |
| WO | 2005/069307 A1 | 7/2005 |

OTHER PUBLICATIONS

International Search Report and Written Opinion of the International Searching Authority for PCT/US2013/067417 dated Feb. 17, 2014 (Forms PCT/ISA/210, PCT/ISA/237).
European Patent Office, Supplementary European Search Report for European Application No. EP 13877709, mailed Sep. 27, 2016.

\* cited by examiner ns of 63 (page 1 of 2)

RIB-TYPE ROUGHNESS DESIGN FOR IMPROVED HEAT TRANSFER IN PWR ROD BUNDLES

CROSS REFERENCE TO RELATED APPLICATION

This application claims priority under 35 U.S.C. §119(e) to U.S. Provisional Patent Application Ser. Nos. 61/776,815, filed Mar. 12, 2013, entitled RIB-TYPE ROUGHNESS DESIGN FOR IMPROVED HEAT TRANSFER IN PWR ROD BUNDLES.

BACKGROUND

1. Field

This invention pertains in general to nuclear power plants and fuel rods assemblies or bundles that are positioned in the nuclear reactor core and, more particularly, to a rib-type roughness placed on the one or more of the fuel rods to provide enhanced heat transfer in the fuel rod assemblies or bundles.

2. Description of Related Art

The reactor core of a nuclear power plant, such as a pressurized water reactor (PWR), contains a plurality, e.g., bundles or assemblies, of nuclear fuel rods. The fuel rods contain uranium oxide fuel. The fuel is encased in sealed tubes, commonly referred to as the fuel cladding. The cladding maintains the fuel in a position, for which controlled fission can proceed and generate heat. The cladding then transfers the heat from the fuel to pressurized water that circulates around the primary loop of the reactor coolant system. The heated water in the primary loop is used to boil water in a steam generator and the steam is then expanded in a turbine that powers an electrical generator.

For the purpose of illustration, FIG. 1 shows a simplified nuclear reactor primary system, including a generally cylindrical reactor pressure vessel 10 having a closure head 12 enclosing a nuclear core 14. A liquid reactor coolant, such as water, is pumped into the vessel 10 by pump 16 through the core 14 where heat energy is absorbed and is discharged to a heat exchanger 18, typically referred to as a steam generator, in which heat is transferred to a utilization circuit (not shown), such as a steam driven turbine generator. The reactor coolant is then returned to the pump 16, completing the primary loop. Typically, a plurality of the above described loops is connected to a single reactor vessel 10 by reactor coolant piping 20.

In a typical nuclear reactor, the reactor core includes a large number of fuel assemblies which each has top and bottom nozzles. A plurality of elongated transversely spaced guide thimbles extends longitudinally between the nozzles. A plurality of transverse support grids are axially spaced along and attached to the guide thimbles.

Each fuel assembly is composed of a plurality of elongated fuel elements or rods which are transversely spaced apart from one another and from the guide thimbles. The fuel rods each contain fissile material and are grouped together in an array which is organized so as to provide a neutron flux in the core which is sufficient to support a high rate of nuclear fission, and thus the release of a large amount of energy in the form of heat. A liquid coolant is pumped upwardly through the core in order to extract some of the heat generated in the core for the production of useful work.

The grids are used to precisely maintain the spacing and support between the fuel rods in the reactor core, provide lateral support for the fuel rods, and induce mixing of the coolant.

The exemplary reactor pressure vessel 10 and nuclear core 14 as shown in FIG. 1 are shown in more detail in FIG. 2. The nuclear core 14 includes a plurality of parallel, vertical, co-extending fuel assemblies 22. For purpose of this description, the other vessel internal structures can be divided into lower internals 24 and upper internals 26. In conventional designs, the lower internals' function is to support, align and guide core components and instrumentation as well as direct flow within the vessel. The upper internals restrain or provide a secondary restraint for the fuel assemblies 22 (only two of which are shown for simplicity in FIG. 2), and support and guide instrumentation and components, such as control rods 28. In the exemplary reactor shown in FIG. 2, coolant enters the reactor vessel 10 through one or more inlet nozzles 30, flows down through an annulus between the vessel and the core barrel 32, is turned 180° in a lower plenum 34, passes upwardly through a lower support plate 37 and a lower core plate 36 upon which the fuel assemblies are seated and through and about the assemblies. In some designs, the lower support plate 37 and the lower core plate 36 are replaced by a single structure, a lower core support plate having the same elevation as 37. The coolant flow through the core and surrounding area 38 is typically large on the order of 400,000 gallons per minute at a velocity of approximately 20 feet per second. The resulting pressure drop and frictional forces tend to cause the fuel assemblies to rise, which movement is restrained by the upper internals, including a circular upper core plate 40. Coolant exiting the core 14 flows along the underside of the upper core plate 40 and upwardly through a plurality of perforations 42. The coolant then flows upwardly and radially outward to one or more outlet nozzles 44.

One of the exemplary fuel assemblies 22 as shown in FIG. 2 is shown in more detail in FIG. 3. Each of the fuel assemblies 22 includes fuel rods 66 grouped in an array thereof. The fuel rods 66 are held in spaced relationship with one another by the grids 64 spaced along the fuel assembly length. Each fuel rod 66 includes a plurality of nuclear fuel pellets 70 and is closed at its opposite ends by upper and lower end plugs 72 and 74, respectively. The pellets 70 are maintained in a stack by a plenum spring 76 disposed between the upper end plug 72 and the top of the pellet stack. The fuel pellets 70, composed of fissile material, are responsible for creating the reactive power of the reactor. There is a cladding which surrounds the pellets to function as a barrier to prevent the fission byproducts from entering the coolant and further contaminating the reactor system.

The grids 64 also provide for coolant mixing to decrease the maximum coolant temperature. Since the heat generated by each of the fuel rods 66 is not uniform, there are thermal gradients in the coolant. One important parameter in the design of the fuel assemblies 22 is to maintain the efficient heat transfer from the fuel rods 66 to the coolant. The higher the amount of heat removed per unit time, the higher the power being generated.

At high enough coolant temperatures, the rate of heat that can be removed per unit of cladding area in a given time decreases abruptly in a significant way. This phenomenon is known as deviation from nucleate boiling or DNB. If within the parameters of reactor operation, the coolant temperature would reach the point of DNB, the cladding surface temperature would increase rapidly in order to evacuate the heat generated inside the fuel rod and rapid cladding oxidation would lead to cladding failure. It is clear that DNB needs to be avoided to prevent fuel rod failures. Since DNB, if it occurs, takes place at the point where the coolant is at its maximum temperature, it follows that decreasing the maximum coolant temperature by coolant mixing within the assembly permits the generation of larger amounts of power without reaching DNB conditions.

Normally, improved mixing is achieved by the use of mixing vanes in the down flow side of the grid 64 structure. The effectiveness of mixing is dependent upon the shape, size and location of the mixing vanes relative to the fuel rods 66.

As shown in FIG. 4, mixing vanes 89 are installed on the upper surface of one of the plurality of grids 64. The mixing vanes 89 create turbulence in the coolant in the nuclear core 14 (shown in FIG. 2), which promotes the transfer of heat from the fuel rod cladding to the coolant. This turbulence is locally intense and rapidly dissipates in the region located downstream of the mixing vanes 89, e.g., in the span or spacing between consecutive grids 64. Thus, for example, in the region 90 the mixing vanes 89 operate to create turbulence and promote heat transfer. However, beyond region 90 further downstream of each of the grids 64, the turbulence dissipates and the heat transfer is lower, resulting in increased limiting conditions for cladding temperature, crud deposition, and oxidation.

It is, therefore, an object of this invention to provide a modified fuel rod cladding having a particular rib-type roughness at least partially formed on the exterior cladding surface that will enhance the heat transfer of the fuel rod in a nuclear reactor and, particularly, in the region downstream of the mixing vanes wherein turbulence is dissipated.

SUMMARY

In one aspect, this invention provides a fuel rod having first and second closed ends and encapsulating a fissionable material axially along at least a portion of an interior volume thereof and an exterior of the fuel rod including a cladding that extends substantially axially between the first and second closed ends. The cladding includes a diameter, an external surface, and a surface modification applied to at least a portion of the external surface. The surface modification includes a plurality of ribs placed parallel to one another and circumferentially around the cladding. Each of the plurality of ribs has a height, a width, a pitch between each of the plurality of ribs. The ratio of the height to the diameter is greater than or equal to about 0.0134 and less than or equal to about 0.0268, the ratio of the height to the width is greater than or equal to about 0.8 and less than or equal to about 1.2, and the pitch is greater than or equal to about nine times the height and less than or equal to about 12 times the height.

The plurality of ribs can be offset from a horizontal axis by an angle ranging from about 0 degrees to about 45 degrees. The fuel rod can be positioned in a fuel assembly in a nuclear core of a pressurized nuclear reactor. The surface modification can be applied to the at least a portion of the external surface located in a region which is not in close proximity to a mixing vane coupled to a spacer grid of a fuel assembly. The surface modification can be applied to the at least a portion of the external surface located in a region wherein turbulence created by a mixing vane coupled to a spacer grid of a fuel assembly is dissipated.

In another aspect, the invention provides a nuclear fuel assembly including an array of a plurality of axially extending elongated tubular pressurized water reactor nuclear fuel elements having first and second closed ends and encapsulating a fissionable material axially along at least a portion of an interior volume thereof and an exterior of at least one of the fuel elements comprising a cladding that extends substantially axially between the first and second closed ends. The cladding includes a surface texture varying axially in a prescribed pattern along at least a portion of an axial length of the cladding. The surface texture includes a plurality of ribs placed parallel to one another and circumferentially around the cladding. Each of the plurality of ribs having a height, a width, and a pitch between each of the plurality of ribs. In certain embodiments, the height, width and pitch may be specified as follows. The ratio of the height to diameter of the cladding is greater than or equal to about 0.0134 and less than or equal to about 0.0268. The ratio of the height to the width is greater than or equal to about 0.8 and less than or equal to about 1.2. The pitch is greater than or equal to about nine times the height and less than or equal to about 12 times the height. The plurality of axially spaced spacer grids can surround and affix the fuel elements in the spaced array and the surface texture of the cladding can be located substantially at a region that is in the span between a consecutive pair of the spacer grids.

In still another aspect, the invention provides a method of enhancing heat transfer in a nuclear fuel core containing a plurality of fuel rods having first and second closed ends and encapsulating a fissionable material axially along at least a portion of an interior volume thereof and an exterior having a cladding that extends substantially axially between the first and second closed ends. The method includes modifying an external surface of the cladding for at least a portion of the plurality of fuel rods by applying to at least a portion of the external surface of one or more of the plurality of fuel rods a roughness. The roughness includes a plurality of ribs placed parallel to one another and circumferentially around the cladding. Each of the plurality of ribs has a height, a width, a pitch between each of the plurality of ribs. The ratio of the height to diameter of the cladding is greater than or equal to about 0.0134 and less than or equal to about 0.0268, a ratio of the height to the width is greater than or equal to about 0.8 and less than or equal to about 1.2, and the pitch is greater than or equal to about nine times the height and less than or equal to about 12 times the height.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 1:
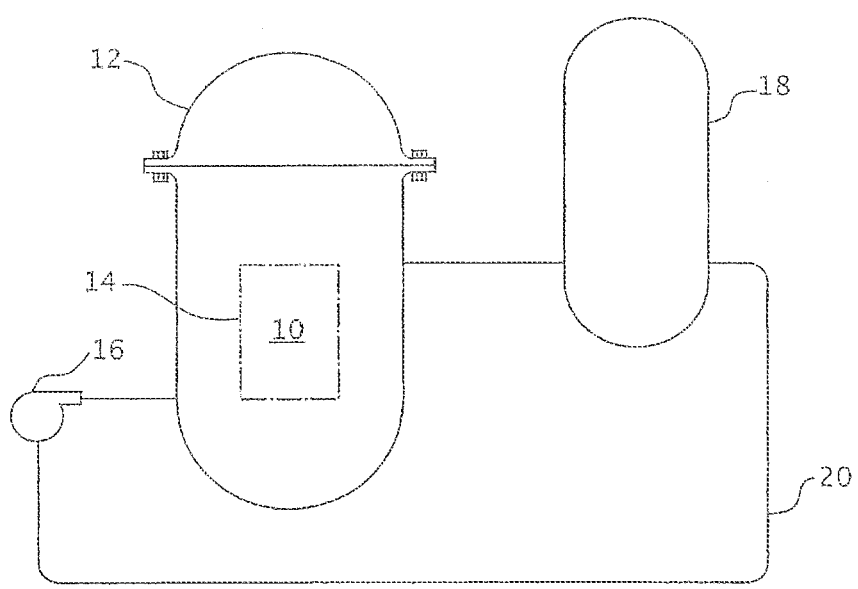
FIG. 1 is a simplified schematic of nuclear reactor primary system, in accordance with the prior art.
Figure 2:
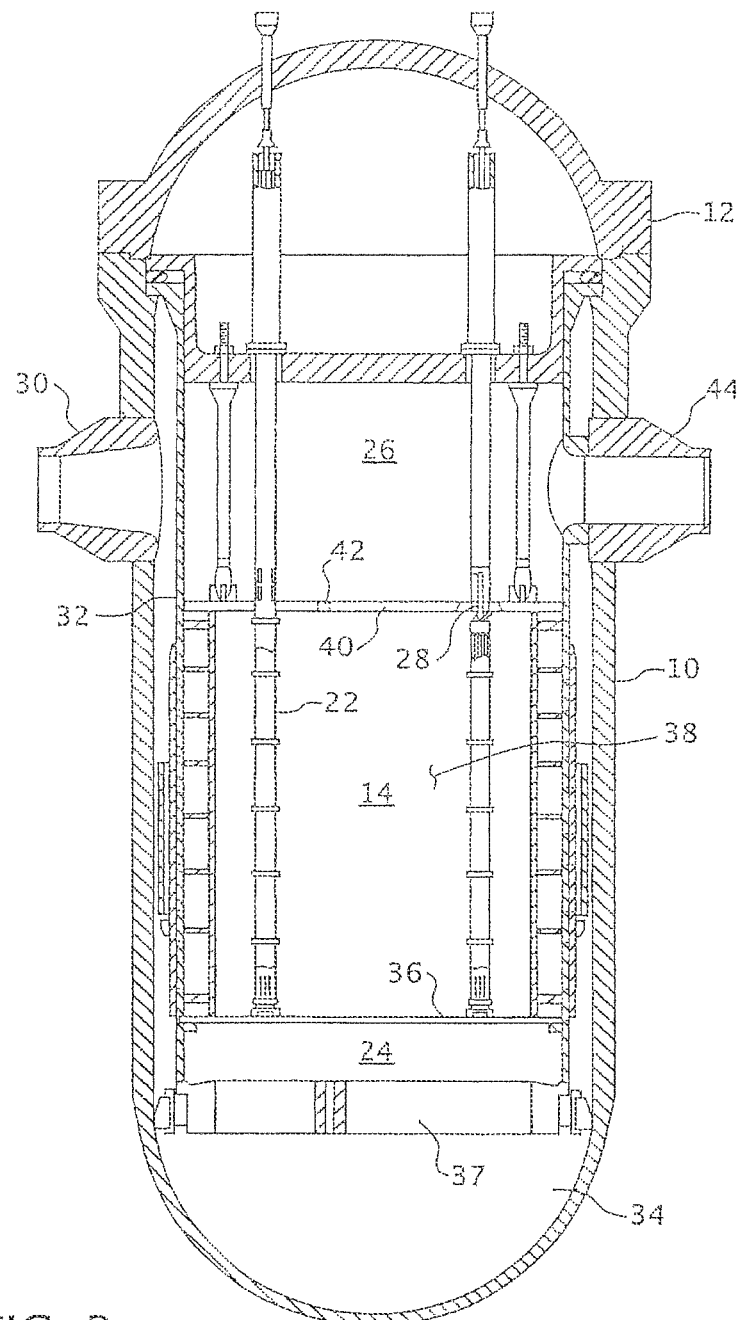
FIG. 2 is an elevational view, partially in section of a nuclear reactor vessel and internal components, in accordance with the prior art.
Figure 3:
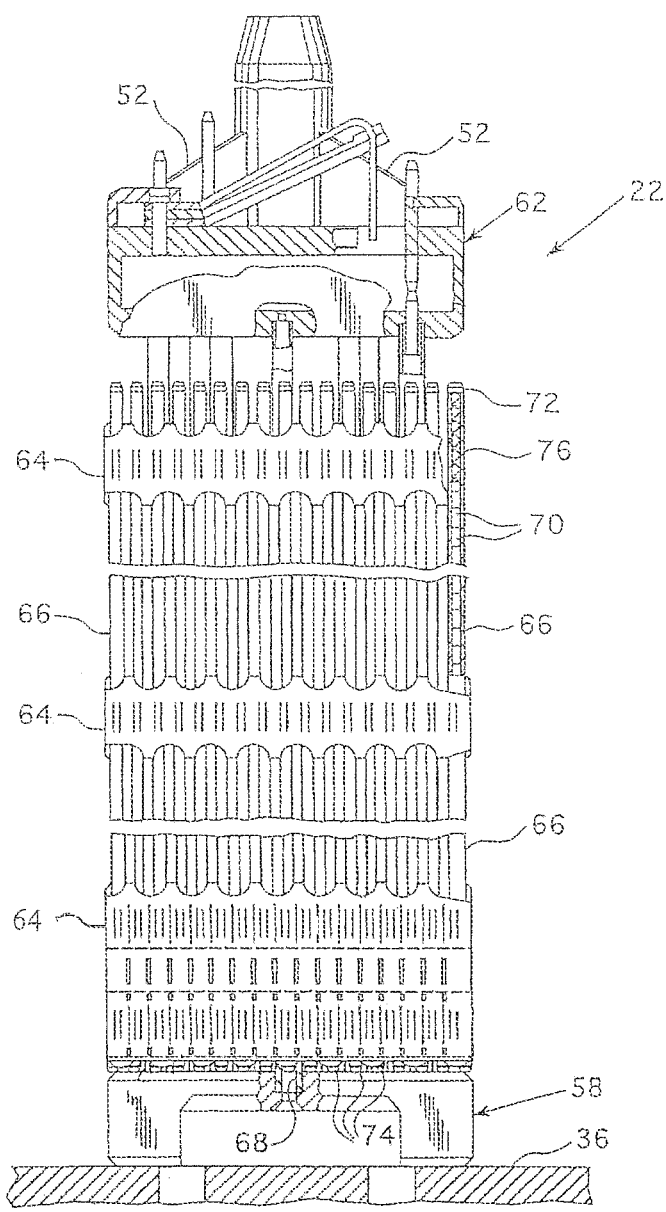
FIG. 3 is an elevational view, partially in section of a fuel assembly illustrated in vertically shortened form, with parts broken away for clarity, in accordance with the prior art.
Figure 4:
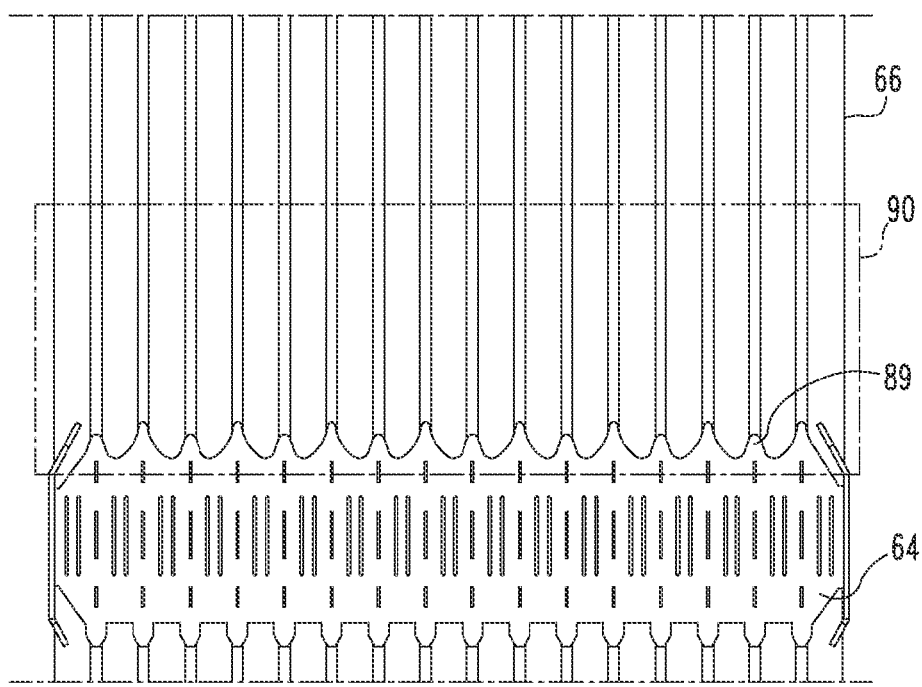
FIG. 4 is an elevational view, partially in section of a spacer grid with mixing vanes coupled thereto, in accordance with the prior art.

The invention pertains generally to a nuclear fuel assembly including a plurality of nuclear fuel rods or elements contained within the fuel assembly. Each of the fuel rods has a first and second closed end, and encapsulates a fissionable material axially along at least a portion of an interior volume thereof. The exterior of the nuclear fuel rods includes a cladding that extends between the first and second closed ends of the nuclear fuel rods. In particular, the invention pertains to a surface modification, e.g., roughness or texture, placed on or applied to at least a portion, e.g., part or section, of the fuel rod cladding or to the entire cladding (and to one or more of the plurality of fuel rods in the nuclear fuel assembly) to improve heat transfer in the nuclear core of a nuclear reactor, such as a pressurized water reactor (PWR).

It is known to install mixing vanes on the upper surfaces of the grids which are spaced along the length of a nuclear fuel assembly. The mixing vanes create turbulence in the coolant in the nuclear core to promote the transfer of heat from the fuel cladding to the coolant. This turbulence is locally intense but rapidly dissipates in the region located downstream of the mixing vanes, e.g., in the span or spacing between consecutive grids. Thus, in the region located near the upper surfaces of the grids where the mixing vanes are installed, the mixing vanes operate to create turbulence and promote heat transfer. However, in the region further downstream of each of the grids and the mixing vanes, the turbulence dissipates and the heat transfer is lower. The lower turbulence and in turn the lower heat transfer in these areas can result in increased limiting conditions for cladding temperature, crud deposition, and oxidation.

It is, therefore, an object of this invention to provide a modified cladding to enhance heat transfer in the nuclear core and, in particular, in areas of the core where turbulence created by the mixing vanes is dissipated (e.g., regions that are not in close proximity to the mixing vanes) and therefore, the heat transfer is lower than in other regions (i.e., regions that are in close proximity to the mixing vanes).

The modified cladding has roughness or texture at least partially applied to or placed on the cladding surface. The roughness or texture can vary axially in a prescribed pattern along at least a portion of an axial length of the cladding. In certain embodiments, the roughness or texture is applied to a portion or part or segment of the external surface of the cladding of one or more fuel rods in a nuclear fuel assembly. In other embodiments, the roughness or texture is applied to the entire external surface of the cladding of one or more fuel rods in a nuclear fuel assembly. The roughened or textured surface is effective to disturb the turbulent boundary layer of the coolant at the surface of the fuel rod.

In particular, the invention includes a specific configuration of artificial rib-type roughness placed on the surface of the cladding. A plurality of ribs is placed parallel to one another and circumferentially around the cladding. The specific configuration includes the shape and dimensions of each rib, the angle or offset of the ribs (with reference to a horizontal axis) and the distance between the ribs, in order to maximize or at least enhance the heat transfer rate in the fuel rod bundles of a nuclear reactor core.

As previously described herein, in a nuclear reactor core, a plurality of axially spaced spacer or support grids surround and affix the fuel elements in a fuel assembly. The surface roughness or texture can be applied to or placed on the cladding in a region that is located within the span between a consecutive pair of spacer or support grids.

In certain embodiments, the surface modification is applied to a portion or a part or a segment of the external surface of the cladding of one or more fuel rods in a nuclear fuel assembly, wherein the portion or the part or the segment is located in a region which is not in close proximity to a mixing vane coupled to a spacer grid of the fuel assembly.

In certain embodiments, the surface modification is placed on or applied to a portion or a part or a segment of the external surface of the cladding of one or more fuel rods in a nuclear fuel assembly, wherein the portion or the part or the segment is located in a region in which turbulence created by a mixing vane coupled to a spacer grid of a fuel assembly is dissipated.

Further, in other embodiments, such as wherein the spacer grids of the fuel assembly do not include mixing vanes, the surface modification may be placed on or applied to the entire external surface of the cladding of one or more fuel rods in a nuclear fuel assembly.

In certain embodiments, the surface modification is placed on or applied to a portion or segment of the external surface of the cladding of one or more fuel rods in a nuclear fuel assembly, wherein the portion or segment is located substantially in a region that is in the span between a consecutive pair of the spacer grids.

Figure 5:
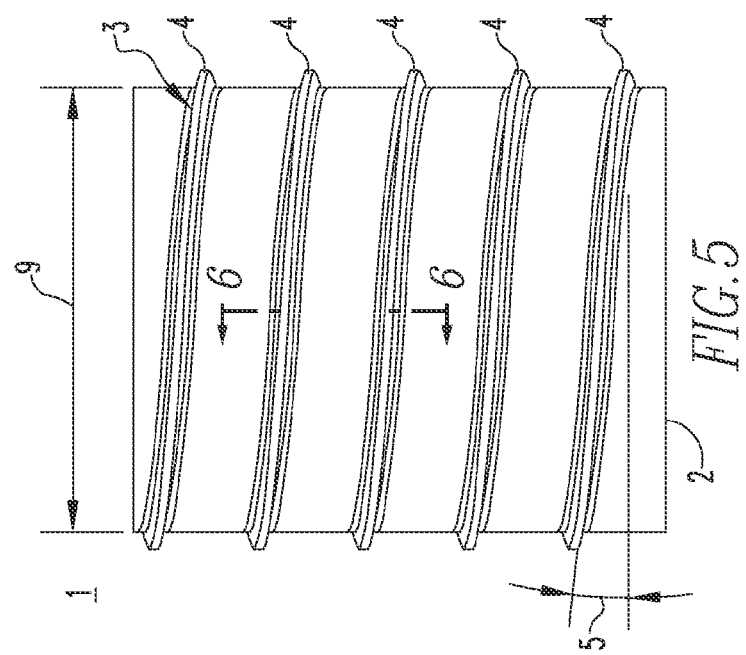
FIG. 5 is an elevational view of a portion of a surface modified fuel rod cladding with a parallel rib-type roughness, in accordance with certain embodiments of the invention.

FIG. 5 is an elevational view showing a portion of a surface-modified fuel rod cladding 1, in accordance with certain embodiments of the invention. The surface modified fuel rod cladding 1 includes a portion of a fuel rod cladding 2 and a structured transverse rib-type roughness configuration 3 placed on or applied to the exterior surface of the fuel rod cladding 2. The rib configuration 3 includes a plurality of ribs 4 which are parallel to each other and each of the plurality of ribs 4 wrap or coil around the circumference of the exterior surface of the fuel rod cladding 2. The plurality of ribs 4 are spaced apart from each other. Further, FIG. 5 shows a diameter 9 of the fuel rod cladding 2 and an offset or angle 5 of each of the plurality of ribs 4, with reference to a horizontal axis.

Figure 6:
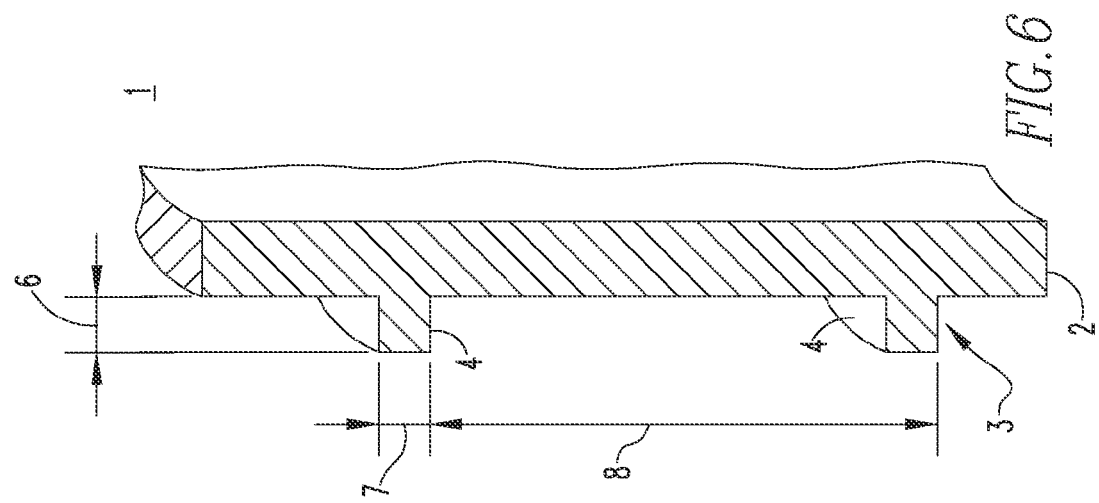
FIG. 6 is a detailed cross section view of a section of the parallel rib-type roughness as shown in FIG. 5, in accordance with certain embodiments of the invention.

FIG. 6 is a detailed cross section view of a portion of the surface modified fuel rod cladding 1 as shown in FIG. 5. FIG. 6 includes the fuel rod cladding 2, the rib configuration 3 and two of the plurality of ribs 4 shown in FIG. 5. Further, FIG. 6 shows a height 6 of each of the ribs 4, a width 7 of each of the ribs 4 and a pitch 8 between the ribs 4.

In certain embodiments, the ratio of the height 6 of each of the ribs 4 to the diameter 9 (shown in FIG. 5) of the fuel rod cladding 2 is greater than or equal to about 0.0134 and less than or equal to about 0.0268 (i.e., about 0.0134≤height/diameter≤about 0.0268).

In certain embodiments, the ratio of the height 6 of each of the ribs 4 to the width 7 of each of the ribs 4 is greater than or equal to about 0.8 and less than or equal to about 1.2 (i.e., about 0.8≤height/width≤about 1.2).

In certain embodiments, the pitch 8 between each of the ribs 4 is greater than or equal to about nine times the height 6 of each of the ribs 4 and less than or equal to about twelve times the height 6 of each of the ribs 4 (i.e., about (9×height)≤pitch≤about (12×height)).

In certain embodiments, the angle 5 of each of the ribs 4 is from about 0° to about 45°, with reference to a horizontal axis. That is, each of the ribs can be offset from a horizontal axis by an angle ranging from about 0 degrees to about 45 degrees.

The values provided for angle 5, height 6, width 7 and pitch 8, are determined for typical core conditions of a pressurized water reactor (PWR) having Reynolds number of approximately 500,000, temperature of approximately 315° C. and pressure of approximately 155 bars.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A fuel rod having first and second closed ends, encapsulating a fissionable material axially along at least a portion of an interior volume thereof, and an exterior of the fuel rod comprising a cladding that extends substantially axially between the first and second closed ends, the cladding comprising:
   an external surface;
   a circumference;
   an axial length;
   a diameter; and
   a surface modification applied to at least a portion of the external surface, the surface modification comprising:
      a rib having a length, a height and a width, the length of the rib coils around the circumference of the external surface of the cladding;
      a sequence of continuous rib loops uniformly spaced along the axial length of the cladding formed by the length of the rib; and
      a pitch measured between adjacent rib loops in the sequence of continuous rib loops,
   wherein a ratio of the height of the rib to the diameter of the cladding is greater than or equal to about 0.0134 and less than or equal to about 0.0268,
   wherein a ratio of the height of the rib to the width of the rib is greater than or equal to about 0.8 and less than or equal to about 1.2, and
   wherein the pitch is greater than or equal to about nine times the height of the rib and less than or equal to about 12 times the height of the rib.

2. The fuel rod of claim 1, wherein each rib loop in the sequence of continuous rib loops is offset from a horizontal axis by an angle ranging from about 0 degrees to about 45 degrees.

3. The fuel rod of claim 1, wherein the surface modification is applied to only a portion of the external surface of the cladding.

4. A nuclear fuel assembly, comprising:
   a spaced array of a plurality of axially extending elongated tubular pressurized water reactor nuclear fuel elements, each having first and second closed ends, encapsulating a fissionable material axially along at least a portion of an interior volume thereof, and an exterior of at least one of the fuel elements comprising a cladding that extends substantially axially between the first and second closed ends, the cladding comprising:
      an external surface;
      a circumference;
      an axial length;
      a diameter; and
      a surface texture varying axially in a prescribed pattern along at least a portion of an axial length of the external surface of said cladding, the surface texture, comprising:
         a rib having a length, a height and a width, the length of the rib coils around the circumference of the external surface of the cladding;
         a sequence of continuous rib loops uniformly spaced along the axial length of the cladding formed by the length of the rib; and
         a pitch measured between adjacent rib loops in the sequence of continuous rib loops,
      wherein a ratio of the height of the rib to the diameter of the cladding is greater than or equal to about 0.0134 and less than or equal to about 0.0268,
      wherein a ratio of the height of the rib to the width of the rib is greater than or equal to about 0.8 and less than or equal to about 1.2, and
      wherein the pitch is greater than or equal to about nine times the height of the rib and less than or equal to about 12 times the height of the rib.

5. The nuclear fuel assembly of claim 4, wherein a plurality of axially spaced spacer grids surround and affix the fuel elements in the spaced array and wherein said surface texture of the cladding is located in a span between a consecutive pair of the spacer grids.

6. A method of enhancing heat transfer in a nuclear fuel core containing a plurality of fuel rods having first and second closed ends, encapsulating a fissionable material axially along at least a portion of an interior volume thereof, and an exterior of at least one of the fuel rods comprising a cladding having a diameter and an external surface that extends substantially axially between the first and second closed ends, comprising:
   modifying the external surface of the cladding for at least a portion of the plurality of fuel rods; and
   applying to at least a portion of the external surface to be modified a roughness, comprising:
      a rib having a length, a height and a width, the length of the rib coils around a circumference of the external surface of the cladding;
      a sequence of continuous rib loops uniformly spaced along the axial length of the cladding formed by the length of the rib; and
      a pitch measured between adjacent rib loops in the sequence of continuous rib loops,
   wherein a ratio of the height of the rib to the diameter of the cladding is greater than or equal to about 0.0134 and less than or equal to about 0.0268,
   wherein a ratio of the height of the rib to the width of the rib is greater than or equal to about 0.8 and less than or equal to about 1.2, and
   wherein the pitch is greater than or equal to about nine times the height of the rib and less than or equal to about 12 times the height of the rib.

* * * * *